United States Patent
Feldman et al.

(10) Patent No.: US 6,693,917 B1
(45) Date of Patent: *Feb. 17, 2004

(54) DIGITAL SUBCHANNEL TRANSCEIVER FOR TRANSMITTING DATA

(75) Inventors: Richard Karl Feldman, Los Altos, CA (US); Farivar Farzaneh, Los Altos, CA (US); Michael Timothy Kauffman, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,496

(22) Filed: Aug. 27, 1999

Related U.S. Application Data (63) Continuation-in-part of application No. 09/063,633, filed on Apr. 20, 1998.

(51) Int. Cl.[7] .................................................. H04J 1/02
(52) U.S. Cl. ....................... 370/488; 370/206; 370/483; 375/146; 375/147; 375/152; 375/329; 375/334
(58) Field of Search ................................. 370/210, 206, 370/483, 488, 497; 375/152, 146, 308, 316–317, 329–334, 343, 350, 346, 222, 260, 371–373, 295–296; 327/141, 151, 160

(56) References Cited

U.S. PATENT DOCUMENTS

| | | | | |
|---|---|---|---|---|
| 4,213,094 A | * | 7/1980 | Wood | 370/215 |
| 4,494,238 A | * | 1/1985 | Groth, Jr. | 375/141 |
| 5,088,111 A | * | 2/1992 | McNamara et al. | 375/290 |
| 5,329,394 A | * | 7/1994 | Calvani et al. | 359/156 |
| 5,970,105 A | * | 10/1999 | Dacus | 375/344 |
| 6,295,272 B1 | * | 9/2001 | Feldman et al. | 370/210 |

* cited by examiner

Primary Examiner—Chi Pham
Assistant Examiner—Thai Hoang
(74) Attorney, Agent, or Firm—Squire, Sanders & Demspey L.L.P.

(57) ABSTRACT

A system for transmitting subchannel data over the same media as high speed data, especially DC balanced high speed data. A digital transmitter receives subchannel data and modulates it onto a subchannel carrier as the host signal in the preferred embodiment using frequency shift keying. The FSK subchannel carrier is added by superposition to the high speed data signal. At the receiver, a low pass filter filters out the subchannel carrier frequency components which are then amplified and subjected to a two-pole anti-aliasing filter to remove the third and fifth harmonics. Analog-to-digital conversion is followed by a digital mix down to remove the subchannel carrier component using a local oscillator at the subchannel carrier frequency. An FIR low pass filter having a triangular time domain response performs anti-aliasing and leaves as an output only frequency components at the positive and negative deviation frequency for Mark and Space. Mark and space detectors then determine the relative magnitude of the signal received at the positive and negative deviation frequencies in the complex phasor domain to determine when Mark and Space frequencies are being received. Because of the ability to have very narrow bandwidths for the passbands of the digital IF filters, the receiver is more sensitive and less susceptible to the need for tuning to accomodate manufacturing variations in the rise times of the high speed data signals.

12 Claims, 4 Drawing Sheets

DIGITAL SUBCHANNEL TRANSCEIVER FOR TRANSMITTING DATA

This is a continuation-in-part of prior U.S. patent application Ser. No. 09/063,633, filed Apr. 20, 1998 entitled SUBCHANNEL MODULATION SCHEME FOR CARRYING MANAGEMENT AND CONTROL DATA OUTSIDE THE REGULAR DATA CHANNEL, which is hereby incorporated by reference.

FIELD OF USE

The invention is useful for transmitting digital data such as management and control data out of band on a subchannel carrier transmitted on the same media as high speed data on a network or digital telephone line without interference therewith. The subchannel carrier uses a portion of the bandwidth that is not heavily populated by high energy frequency components of the high speed data traffic.

BACKGROUND OF THE INVENTION

In many large computer systems such as are found in banks, at credit card transaction processing centers; etc., huge amounts of data must be moved and stored. Typically, very large disk arrays are used to store the data and these disk arrays are connected to file servers. These type systems require of the server/disk connection high reliability, high speed, large throughput and large bandwidth since huge amounts of information are being processed and a system shutdown or slowdown adversely impacts customers (and possibly safety in the case of large air traffic control computer systems). Because these systems can be spread out over several buildings or even if all the servers and disk arrays are within the same building, the easiest way to interconnect all the servers and disk drives for maximum redundancy is through a local area network usually with a hub having drop lines connected to all servers, disk drives and other units. Because disks fail frequently and must be replaced by redundant disks, there is a large amount of management and control traffic that must go back and forth over the server/disk array connections and through the hub to the management and control process. This management and control traffic is necessary to determine which disks are on-line, where those disks are on the network, operational disk status, how many fans are still running (because when a fan fails, the disk it cools will probably be next), what servers are still operational, network fault status, network traffic conditions and statistics, etc.

Most if not all such digital data transmission systems require the bidirectional transmission of digital management and control data between nodes to collect data regarding the performance of the system and manage the various nodes, bridges etc. in the system. The out of band management and control data will be hereafter referred to as subchannel data.

There are many ways of modulating subchannel data onto a high speed digital signal, many of which are taught in a prior co-pending application of the assignee of the present application, which is hereby incorporated by reference. However, many of these prior art methodologies will only work in some systems and not in others. For example, modulating the subchannel data onto the clock by phase or frequency modulation will cause too much jitter in some systems, and also requires access to the high speed transmitter and receiver clock generation and clock recovery circuts. This is not possible in all cases, so a methodology that does not requires such access is preferred. The embodiments disclosed herein do not require such access. Amplitude modulation of the data with the subchannel modulation will not work in systems where digital buffers stand between the subchannel transmitter and the transmission media such as occurs where the high speed data media is fiber and a digital electronic-to-light media driver transducer is used to convert the digital high speed data to light signals.

Out of band management topologies get management data to and from the hub easily enough on separate network segments, which has its own set of problems described below. However, getting management and control data to and from the disk arrays in-band is more difficult. The management and control data sits in registers on a board in the disk array. In order to get this low speed, low priority data onto the high speed data path, special circuitry must be built in each disk array which interfaces these registers to the high speed data path. This circuitry functions to collect and format the management and control data into the type of data packets used in the high speed data path and to transmit these packets with the correct communication protocol to the hub. Since the management and control data does not consume an entire packet of the size used to send data on the high speed data path, some packet Space is empty and wasted. The need for this special circuitry to put the management and control data in the high speed data path makes the disk arrays more expensive and complex and placing management and control data in the high speed data packets wastes network throughput.

Some disk arrays store the management and control data on a separate disk drive which can be polled. However, this approach does not solve the problem of the need for special circuitry to get the management and control data into packets in the high speed data path and the resulting extra complexity and wasted throughput. It only allows time shifting thereby enabling transmission of the management and control data when network traffic volume is low and the throughput loss is not as significant. This time shifting is implemented by providing more storage capacity for the management and control data than is provided in the registers of the other prior art type disk arrays described above.

In some networks, management traffic is transmitted in-band by placing the management and control packets inside empty data packets and shipping these partially filled packets over the existing network connections between the server, hub and disk drives. This causes loss in throughput since the data packets are large and the management data does not fill the data packets entirely. This leads to wasted bandwidth. Further, arbitration by the management process to have one or more packets awarded to it for management traffic and to have access to the network so that transmissions to all servers and disk drive arrays of management messages consumes processing resources and network throughput unnecessarily.

One proposal has been made in the prior art to interleave special management and control packets in with the packet stream on the high speed data path to alleviate the above mentioned problem. However, this makes the design of the integrated circuits that implement the processing on the various network protocol layers more complex and difficult. So far this approach has been a commercial failure.

Another approach that has been tried in the prior art for transmission of management and control packets is to provide an entirely separate network for the management and control data such that each server and disk array is connected to the out of band management and control process running on a separate diagnostic processor by its own network segment. This substantially increases the wiring and connection cost of the system, especially in distributed systems, as every server and disk array must have an additional network segment connected thereto. In addition, each server and disk array uses a card slot for the management and control network card which adds to the expense, complexity and failure point count of each of these units.

A multiplexing approach that has been used in the prior art to send multiple television signals over the same media is represented by U.S. Pat. No. 3,623,105. This patent teaches receiving multiple video signals and translating each one to a different channel or subband and adding all the subband signals together to form a composite signal. The composite signal is then applied to the frequency control input of a VCO having a nominal frequency of 750 mHz. The output of the VCO is applied to one input of a pulse width modulator the other input of which receives an 18 gHz carrier. The pulse width modulator serves to key the 18 gHz carrier in accordance with the period of the signal from the VCO so that what is transmitted is a train of 18 gHz waves the width of each wave or "pulse" being set by the instantaneous period of the signal output from the VCO.

Another approach to implement a subchannel or auxiliary channel over a digital communication system is represented by U.S. Pat. No. 4,079,203 to Dragoo. This patent teaches an auxiliary channel implemented on a time division multiplexed carrier system by modulating the pulse repetition rate of the digital bitstream on the transmit side of the transaction. Each transceiver transmit section includes a FIFO shift register acting as a buffer. Modulation of the auxiliary channel data is carried out by varying the rate at which the digital information of the main channel is clocked out of the FIFO shift register at the transmitting end. The modulating signal varies the pulse repetition rate of a voltage controlled multivibrator which has its output coupled to the clock out input of the FIFO shift register and to a phase comparator of a phase lock loop. Data is clocked in using a clock signal derived from the incoming serial data stream. One drawback of this system is that the capacity of the FIFO can be exceeded if the clock out rate falls substantially behind the clock in rate because of the nature of the modulating signal during certain intervals.

Another approach which has been tried in the prior art is represented by U.S. Pat. No. 4,425,642 to Moses et al. This patent teaches sending digital data simultaneously with analog signals over the same media used by an analog signal communication system such as a telephone or television video. This is done by converting the digital data into very low power multifrequency signals consisting of fundamentals and harmonics. Although the harmonics are in the frequency range of the main signals, their low power does not cause substantial interference. Complicated filter arrangements at the receiver end separate out the harmonics and fundamentals that encode the digital signals and demodulation circuitry at the receiver decodes these frequencies back into digital data. This approach is not well suited to a system where the main data flow is digital and requires complex filtering and decoding arrangements at the receiver and is therefore unduly expensive and complex.

Another approach that has been tried in the prior art is exemplified by U.S. Pat. No. 4,677,608 to Forsberg. This patent teaches a method of implementing a service channel over a fiber optic system line which carries high data rate, e.g., 34 megabits/sec, data encoded with a code the power spectrum of which is heavily suppressed for low frequencies. The low frequency section of the media bandwidth is used to transmit a service channel with a low bandwidth. The service channel signals are frequency modulated, and this frequency modulated signal carrying the service channel data is then used to pulse width modulate pulses forming the high speed data stream.

It is critical to note in fully understanding the invention that this Forsberg scheme only transmits high speed data in the RZ or return to zero format on the fiber optic media, and, if NRZ format high speed data is input to the pulse width modulator, the NRZ format high speed data is converted to RZ format high speed data for transmission on the fiber optic media by performing an AND operation with the clock, as shown in FIG. 5 (see Col. 3, lines 58–61). Either way, the RZ data is a stream of pulses (during logic 1 bit times only) that are pulse width modulated by the subchannel carrier signal. RZ format high speed data is not compatible with standard high speed data receivers designed in accordance with the Fibre Channel and Gigabit Ethernet standards which are the network environments in which the various species of the invention disclosed herein are intended to work. Also, with RZ data, the number of transitions from one logic state to another is approximately double the number of transitions of NRZ data over the same number of bit times. Forsberg's system pulse width modulates each pulse representing a logic 1 so he gets perturbations of the time of crossing a reference voltage for both a rising edge and a falling edge of that pulse. With RZ data, if two consecutive logic 1's are followed by two consecutive logic 0's over four bit times, there will be a pulse with two transitions in each of the first two bit times (representing two consecutive logic 1's) and no pulses in the next two bit times. In contrast, with NRZ data for the same hypothetical, there will be a rising edge at the beginning of the first bit time and a falling edge at the end of the second bit time and no transitions during the third and fourth bit times.

The critical distinction is that NRZ data has a transition density which is variable over time depending upon the content of the data even if the data is D.C. balanced, while D.C. balanced RZ data does not have a variable transition density. RZ data is also incompatible with Fibre Channel networks. Since the subchannel information in Forsberg's system is expressed in the form of perturbations of the time of crossing the reference voltage on each transition of all logic 1 pulses, his system has a known and reliable number of transitions in which to send subchannel energy. Therefore, Forsberg does not have a variable transition density problem, and teaches no circuitry to deal with the fact that where pulse width modulation is in used to carry the subchannel information, transition density variations vary the magnitude of the subchannel signal at the receiver. Because RZ data is used exclusively in the Forsberg system as the data format on the media, a much stronger and nonvarying amplitude subchannel signal is available at the subchannel receiver which is easier to detect in the presence of noise.

Forsberg's system apparently was designed to work in telephony systems built by Ericsson (the assignee of the Forsberg technology) which are not transmitting One Gigabit digital data on a local area network. This conclusion can be drawn from the teachings at Col. 2. line 65 where the subchannel data rate is indicated to be 0.3–4 kHz, and Col. 3, line 6 where the FM modulated subchannel data signal is indicated to be 35–65 kHz, and from Col. 2, line 54 where the high speed bit rate is taught to be $f_0$ and Col. 3, lines 21 and 22 where the clock rate is taught to be $f_0=1/T$ and Col. 3, lines 35–36 where the clock frequency is taught to be around 40 MHz.

The prior art subchannel transmitter described in co-pending application Ser. No. 09/063,633, filed Apr. 20, 1998, entitled SUBCHANNEL MODULATION SCHEME FOR CARRYING MANAGEMENT AND CONTROL DATA OUTSIDE THE REGULAR DATA CHANNEL solved these problems by using a form of pulse width modulation implemented by summing the high speed data with frequency shift keyed subchannel data modulated onto a carrier having a frequency that is much lower than the 1 GB high speed data. The frequency shift keyed carrier signal instantaneous amplitudes were added to the 1 GB data stream, but since the carrier frequency of the frequency shift keyed subchannel carrier was so much lower than the 1 GB data rate, the effect was as if a reference voltage level from which the logic 1 and logic 0 levels were measured was being changed at a slow rate relative to the high speed data rate. This raised and lowered the logic 1 and logic 0 levels of the high speed data in accordance with the lower frequency subchannel data, but these raised and lowered logic 1 and logic 0 levels were lost when the high speed data signal was passed through a digital buffer. However, the raised and lowered levels also changed the timing of zero crossings of the high speed data, so the subchannel data survived the digital buffer as pulse width modulation in the form of the perturbed timing of the zero crossings of the high speed data. Low pass filtering and pulse width demodulation techniques are used in the receiver to recover the subchannel data since the carrier frequency of the subchannel lies in the range of frequencies where the spectrum of the high speed data does not contain much energy since 8B/10B encoding or other DC balanced encoding schemes are used for the high speed data.

While this system works well, receiver sensitivity can be improved, and the subchannel transmitter and receiver can be made both smaller and cheaper by using digital techniques. The original subchannel receiver was relatively inexpensive since it was constructed with standard off the shelf ceramic filters that had a passband of about 110 kHz. Since these were readily available, they were inexpensive. However, that bandwidth is vastly greater than is needed to receive the relatively slow baud rate of the subchannel data. Thus, a need arose for a receiver design with a more narrow bandwidth that could be made more selective so as to reject more of the spurious noise in the frequency range of the subchannel signal. Narrower receiver passband characteristics allows subchannel signals with worse signal-to-noise ratios to be received.

Also, the original subchannel transmitter used an expensive numerically controlled oscillator and a high-speed digital-to-analog converter and was not a one chip design so it was relatively expensive to build. The reason this particular analog design was selected was for flexibility purposes because it allowed the subchannel carrier frequency to be programmed. At that time, it was unclear what the subchannel carrier frequency should be to get best performance in the Fourier spectrum of the 8b/10b encoded high speed data. Certain GBICs and other third party vendor equipment that the subchannel signal had to pass through would attenuate the subchannel carrier more than other equipment. This was a problem because the subchannel carrier signals does not have much more power than the frequency components in the same frequency range caused by the 8b/10b encoded high speed data signal. The signal power of the subchannel carrier signal cannot be increased at will to improve the signal-to-noise ratio, because to do so causes greater pulse width modulation excursions which are interpreted in the high speed data receivers as jitter. Excessive jitter in the high speed data receivers can cause an intolerable bit error rate, and, in particularly bad cases, can cause loss of clock synchronization.

However, experience in actual operations in the field has brought to light the best frequency for the subchannel carrier. Further, the frequency deviation between the Mark and Space carrier frequencies that propagate best through the third party vendor components in the high speed signal path is better understood. Thus, there is a need for a subchannel transceiver design which can also be made both less expensive and smaller. Preferably, this subchannel transceiver is implemented as a one chip digital design with no programmability of the subchannel carrier frequency but a single chip is not absolutely required. Also, lack of programmability of the subchannel carrier frequency is not essential to the invention, and transceivers with programmable carrier frequencies are intended to be within the scope of the claims appended hereto.

Further, with the prior subchannel transceivers, much attention had to be paid to adjusting the transmit levels of the analog frequency shift keyed subchannel signal to avoid causing excessive jitter and to compensate for manufacturing variations in the other components used in the high speed signal path. This need for scrutiny and adjustment for every installation is inconvenient and is labor intensive. Thus, a need has arisen for a subchannel transceiver structure with less of a requirement for adjustment at the site of the manufacturer of equipment into which the subchannel transceivers are included. However, since there are many analog systems still deployed in the field, any new subchannel transmitter and receiver structures for the subchannel data must be compatible with these legacy systems.

SUMMARY OF THE INVENTION

The genus of the invention defined herein is defined by the following structural characteristics.

First, there is a media such as fiber optic cable or copper coaxial cable or other copper media such as twisted pair which functions to carry high speed digital data from a high speed digital data transmitter to a high speed digital data receiver. High speed digital data in this regard just means a data stream on an Ethernet, Fiber Channel, ring or other network, telephony system or other system for delivering data other than subchannel data.

Second, there is a digital subchannel transmitter for sendin subchannel data which is a separate data stream from the high speed data and has a much lower data rate. The subchannel transmitter includes a modulator to modulate the subchannel data onto a host signal which can propagate across said media without excessive attenuation. The host signal can be a separate subchannel carrier, the clock embedded into the high speed data or the high speed data waveform itself. In the preferred species, the modulator frequency shift keys the subchannel data onto a subchannel carrier which has a frequency which is set in a portion of the spectrum of the high speed data where the amount of interference from the high speed data frequency components is not so high as to force the subchannel modulation amplitude to be so high as to cause jitter in the high speed data receiver which is excessive. In these preferred embodiments, the modulator includes a local oscillator in analog or digital form which generates a carrier signal at the subchannel carrier frequency. In one embodiment, the subchannel carrier frequency is just over 1 MHz, but in other more preferable embodiments that do not have to be concerned with compatibility with previous designs, the subchannel carrier frequency is between 0.5 and 0.75 MHz (assuming a one gigabit high speed data link). In alternative species, such as are disclosed in the parent application, the subchannel data is phase or frequency modulated by the modulator onto the high speed data clock. In the case of a fiber media, the modulator modulates the subchannel data onto the light intensity of the pulses generated by the laser diode by converting the subchannel data to a current signal and adding the current signal to the current signal generated by the high speed data or to the bias signal that is added to the current signal generated by the high speed data. The combined current signal is then used to drive the laser diode. Regardless of form of the host signal that is used to propagate the subchannel data across the media, the modulator uses a form of modulation and uses a sufficient amplitude given the characteristics of the host signal and the media such that the subchannel data can be detected in the presence of noise. The characteristics of the high speed data signal that are important to consider are the amplitude, rise time, transition density, encoding type (DC balanced?) or other characteristics of the high speed data. For example, transition density and rise time are important considerations in determining the proper amplitude of subchannel carrier signal to inject for a given media type in pulse width modulated embodiments so as to develop sufficient subchannel modulation intensity at the subchannel receiver such that the signal can be detected in the presence of noise without causing excessive jitter. In some species, the subchannel transmitter includes a variable attenuator which is used to control the amplitude of the injected subchannel carrier such that if a copper media is substituted for a fiber media, the amplitude of the injected subchannel carrier can be reduced so as to not cause excessive jitter and loss of sync of the high speed data receiver clock recovery PLL. This is made necessary by the differences in losses between copper and fiber media for the high frequency components of the high speed data signal and the lower frequency components of the subchannel data. In transmitters where the media type is known, and never will be changed, the variable attenuator is not necessary, and fixed attenuation elements or other circuitry can be used to generate the correct amplitude for the subchannel carrier signal. The modulator must use a modulation type and intensity such that the modulation carrying the subchannel data information will pass through said media and any associated drivers or transducers at the transmitter and/or receiver end of the connection without excessive attenuation such that the subchannel can be detected and recovered at the location of the subchannel receiver. The modulation type and intensity can vary depending upon the media and whether the combined high speed data and subchannel modulation need to pass through digital type drivers/transducers. Pulse width modulation works best if the combined signal must pass through digital drivers, but other forms of modulation such as clock phase or frequency modulation or laser diode intensity modulation can also be used if digital drivers are present. Where no digital drivers are present between the subchannel injection and extraction points, such as in copper media, the types of modulation that can be used by the subchannel transmitter include all known forms of modulation such as BPSK, QPSK, AM, FM, pulse position and pulse amplitude modulation, etc. The various types of modulation schemes and modulators are disclosed in: Lee & Messerschmitt, *Digital Communications*, 2d Ed., Kluwer Academic Publishers, Boston (1994) ISBN 0-7923-9391-0, TK5103.7.L44; and, Haykin, *Communication Systems*, 3d Ed., Wiley & Sons, Inc., New York, N.Y. ((1994) ISBN 0-471-57178-8, TK5101.H37, both of which are hereby incorporated by reference. In some embodiments, the subchannel transmitter includes a UART to serialize parallel format subchannel input data. In other embodiments, the UART has a selectable output baud rate. In other embodiments, the subchannel data is input in parallel format and is serialized by one or more parallel load, serial output shift registers in the subchannel transmitter.

Third, a subchannel receiver is needed to detect the subchannel data. The subchannel receiver in the genus defined herein can be either analog or digital, but it must have a much more narrow filter bandwidth than is currently available in commercial frequency shift keyed receiver chips or separate ceramic filters. The bandwidth of the receiver intermediate frequency section must be just wide enough to encompass the spectrum of the subchannel data so as to pass most if not all of these subchannel frequency components at whatever data rate is chosen for the subchannel data while rejecting substantially all of the high speed data frequency components outside the spectrum of the subchannel data. While the high speed data frequency components that overlap the subchannel frequency components in frequency will pass through this bandpass filter (usually located in the IF section of the receiver), there will be far fewer frequency components from the high speed data at frequencies above and below the subchannel spectrum which will be passed than in previous designs by the assignee. This makes the receiver more selective and sensitive thereby eliminating sensitivity to manufacturing variations in rise time of the high speed data signals in FSK embodiments. In embodiments where the subchannel data rate is selectable, the bandwidth of the receiver IF bandpass filter is also selectable so as to be wider for higher baud rate, subchannel data. In commerically available FSK integrated receivers with external bandpass filters for the IF section, the most narrow commercially available bandpass filter which is reasonable in price is an external ceramic filter which has a bandwidth of about 100 KHz (at standard FM frequencies). Very narrow external ceramic filters with bandwidths on the order from 4–12 KHz are available for AM receivers, but they are not useable in the subchannel application because the Mark and Space frequencies are 56 KHz apart, so these AM type filters are not wide enough to pass both the Mark and the Space frequencies. The 56 KHz spacing is needed in the preferred embodiment for compatibility with previous designs. However, if there is no prior system compatibility issue, a smaller deviation frequency can be selected, and the more narrow AM type analog receiver chips with the narrow bandwidth AM type ceramic filters could be used to achieve similar performance to the narrow bandwidth digital filters and digital demodulator design disclosed herein. Such an AM type analog receiver and demodulator would have the same structure as the analog receiver disclosed in the parent application, which is hereby incorporated by reference, but FSK modulation with smaller deviation frequency would still be used. At the deviation frequency chosen for the Mark and Space frequencies (Mark is 1.1808 MHz or 41*28.8 KHz and Space is 1.1232 MHz or 39*28.8 KHz) originally chosen for the analog receiver, the bandwidth of a filter that encompasses the spectrum of both the Mark and Space frequencies is only 57 KHz wide. Thus, the older design 100 KHz bandwidth let more noise from the high speed data frequency components in the vicinity of 1 MHz in than was necessary. The basic idea behind the improved receivers disclosed herein is to use a much more narrow bandwidth filter in the IF section of the receiver so as to reject more high speed data noise and make the receiver more sensitive and selective to the subchannel data signal only. This has two benefits. First, the more narrow filter bandwidth can be easily achieved with digital FIR filters at reasonable expense so an entirely digital receiver can be made which is completely integrated on an ASIC and this makes the receiver less expensive to build and have higher sensitivity and selectivity than the prior analog receiver design. The higher sensitivity and selectivity provides the second benefit which is elimination of the need for adjustments of the transmitter subchannel carrier magnitude of the injected signal and receiver tuning for every shipped hub or switch with a subchannel system in it to take into account the lot-to-lot manufacturing variability of the rise times of the high speed data signals. The greater sensitivity of the receivers with smaller IF filter bandwidth provides a larger window such that regardless of variations in the rise times of the high speed data from one unit to another, the minimum subchannel signal can be detected with no problem and the maximum subchannel signal will not cause problems with high speed data reception. Thus, variable attenuators are needed in the subchannel transmitters only where media type switches might occur. The same result can be achieved with an analog receiver of the design disclosed in FIG. 18 of the parent case, but a custom designed filter 292 with a bandwidth of only about 57 KHz must be provided (or whatever bandwidth is adequate to encompass both the Mark and Space frequencies for whatever deviation frequency is selected). If another form of modulation is selected such as QPSK etc., then the bandwidth of the filter in the receiver IF section must be just wide enough to pass enough of the frequency components to provide effective subchannel detection without letting unnecessary noise from the high speed data spectrum. This means most of the high speed data frequency components above and below the frequency of the subchannel spectrum must be rejected. Detection of the subchannel bits depends upon the type of modulation used. The detector will function to recover the subchannel bits by generating from the signal output by the bandpass filter one or more signals having characteristics which depend upon the subchannel data bits encoded in the host signal. In the case of FSK modulation, the detector operates by generating a single signal which has a voltage that depends upon whether a Mark or Space is being received at any particular time or it can generate two signals, one of which has a magnitude that is higher than the other when a Mark is being received and vice-versa when a Space is being received. In the case where the subchannel signal is used to frequency or phase modulate the clock embedded in the high speed data signal, the detector can take the form of a circuit that recovers the subchannel bits from the error signal generated by the phase detector in the phase lock loop of the clock recovery circuit in the high speed data receiver. This error signal will have a first characteristic when the subchannel bit is logic one thereby altering the frequency or phase of the high speed data clock in a first direction, and will have a second characteristic when the subchannel data bit is a logic zero thereby altering the frequency or phase of the high speed data clock in a second direction. If the subchannel data is modulated onto the high speed data signal itself by modifying the intensity of the light pulses generated for the high speed data in a first direction for a logic one and in a second direction for a logic zero, then the detector is an envelope detector that detects the changes in the amplitude of the envelope of the high speed data light pulses and converts these changes in amplitude to subchannel bits.

DETAILED DESCRIPTION OF THE PREFERRED AND ALTERNATIVE EMBODIMENTS

Figure 1:
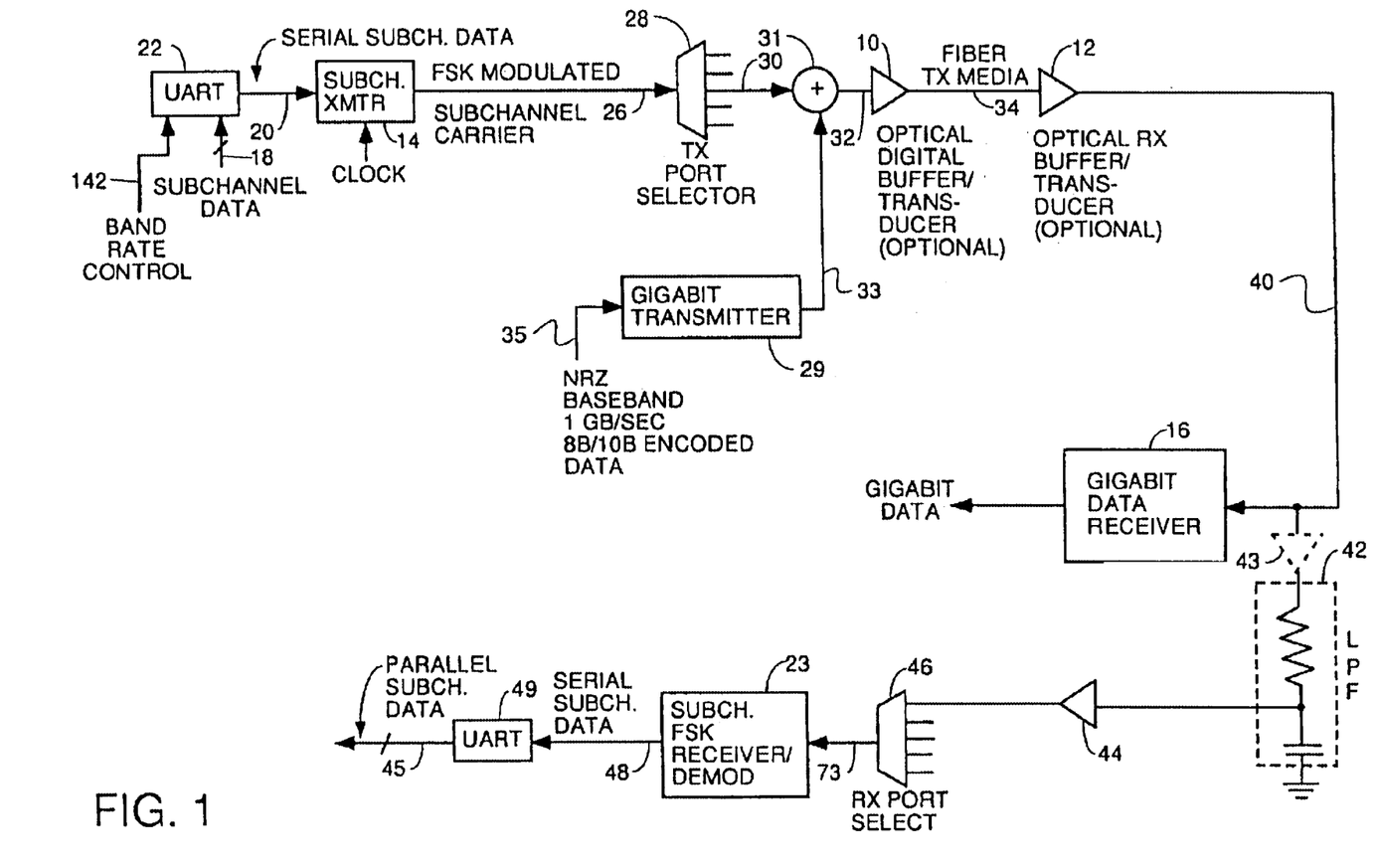
FIG. 1 is a block diagram of one FSK based species within the genus of embodiments that comprise the invention for use in systems where digital buffers at the input and output of the shared media.
Figure 4:
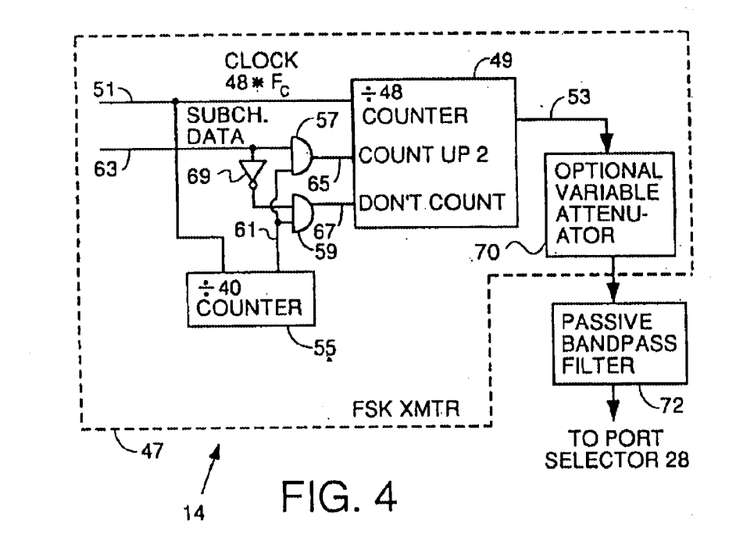
FIG. 4 is a diagram of the preferred form of digital FSK subchannel transmitter.

Referring to FIG. 1, there is shown a block diagram of one FSK based species within the genus of digital embodiments that comprise the invention. This embodiment uses frequency shift keyed modulation implemented by subchannel transmitter 14. Although any commercially available frequency shift keying modulator chip such as the digital synthesizer chip disclosed in the parent application and its equivalents may be used, a simple and inexpensive custom circuit embodiment is shown in FIG. 4. The subchannel transmitter receives a clock signal on line 7 which is set at 18.423 MHz in the preferred embodiment which is $1920*F_b$ where $F_b$ is the baud rate of the subchannel data, which, in the preferred embodiment is 9600 baud.

FSK modulation is used so as to allow the subcarrier information to pass successfully through optional digital buffers 10 and 12. Since these buffers have outputs which have fixed logic levels, amplitude modulation of the high speed data by the subcarrier would not make it through the buffers 10 and 12. These electrical-to-light signal transducers 10 and 12 are digital because the amplitude of the output light from transducer 10 does not depend upon the amplitude of the incoming electrical signals. Whatever light intensity for a logic 1 is produced whenever the input signal exceeds the discrimination threshold on the input, regardless of by how much that threshold is exceeded. Similarly for the logic 0 light output intensity.

However, in systems where digital buffers 10 and 12 are not used such as where the high speed 1 Gbyte data is launched directly onto copper media, for example, other types of modulation could be used. Typically, for copper media connecting the gigabit transceivers together, digital buffers 10 and 12 are not used.

Systems which use other types of modulation such as modulation of the clock with the subchannel signal or amplitude modulation of the laser signal intensity on fiber media using the subchannel data, are disclosed in the parent application. Likewise, even in embodiments where digital buffers 10 and 12 are used, other types of modulation which can successfully pass through the digital buffers and not cause excessive jitter in the gigabit data receiver 16 could also be used.

In the embodiment shown in FIG. 1, parallel format subchannel data is supplied on bus 18 from any hardware or computer process source. This data is converted to a serial data stream on bus 20 by UART 22 of conventional design which is coupled to the data input of subchannel transmitter 14. The UART is optional, and in other embodiments, the parallel data on bus 18 can be applied directly to the data input of the subchannel transmitter. Likewise, in other embodiments, the hardware or software process which is supplying the subchannel data can supply serial format data to the subchannel transmitter. In the case where the subchannel transmitter receives parallel format data, it converts it to serial format data for use in generating Mark and Space carrier frequency shifts.

The UART 22 is structured, in the preferred embodiment, to have a flexible output baud rate of from 9.6 Kbaud to 56 Kbaud in small steps such that the baud rate can be changed by inputting one or more command bytes on bus 142 from the process controlling the subchannel computer (not shown). Any conventional UART design, including known variable baud rate designs can be used to implement UART 22. Since the subchannel receiver is digital and uses digital passband filters, the passband and selectivity of the receiver can be modified simply by changing the filter coefficients. The advantage of this structure is that when noise conditions are favorable, the UART can be ordered to send serial data at a higher baud rate, and the receiver filter coefficients can be changed to give the receiver passband the necessary wider bandwidth needed to receive the higher baud rate subchannel data. When noise conditions become less favorable, the UART 22 can be ordered to slow down its output baud rate and the filter coefficients of the subchannel receiver 23 can be changed to narrow the passband down to a bandwidth suitable for receiving a 9600 baud subchannel signal thereby rejecting greater amounts of noise and giving the receiver greater sensitivity and selectivity.

The subchannel transmitter, in this embodiment, implements frequency shift keyed modulation by generating a subchannel carrier at a frequency $F_c$ of 1.152 MHz and converts the digital subchannel data to subchannel carrier frequency shifts to Mark and Space frequencies, $F_m$ and $F_s$, respectively, which are, respectively:

$$F_m = \frac{41}{40} * F_c$$
$$F_s = \frac{39}{40} * F_c$$

The FSK modulated subchannel carrier is output on line 26 to the input port of a port selector switch 28 which functions to select to which output port of the host hub or switch to direct the subchannel transmissions. This switch 28 is present because the subchannel transmitter is usually implemented in a high speed data hub with many ports coupled to drop lines which are connected to various pieces of equipment in the network. The management and control process (not shown) needs to be able to communicate bidirectionally with each of the nodes on the network to manage the network. Since management and control data does not have to be sent to or gathered from all nodes simultaneously, it is less expensive to include only one subchannel transmitter in the hub and have the management and control process control switch 28 in accordance with which piece of equipment to which a management and control packet is to be transmitted.

The signal on line 30 is input to a summer 31. In reality, the summer 31 is just a summing junction since the signals to be added are analog and can be added by superposition. The other input to the summer is the gigabit data signal on line 33. This signal is output by conventional gigabit transmitter 29 acting on the NRZ baseband 8B/10B encoded data input on line 35.

Figure 2:
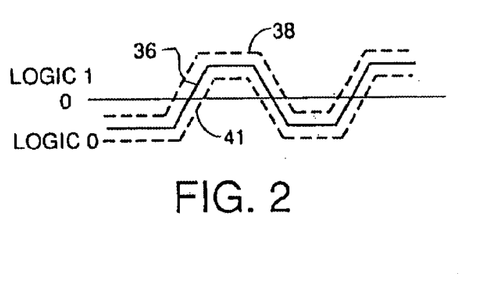
FIG. 2 is a waveform diagram showing how superposition of the subchannel carrier signal onto the high speed data waveform changes the amplitude of the logic 1 and 0 levels thereof before passing through a digital buffer.

FIG. 2 shows the composite gigabit data signal with the much lower subchannel carrier voltage imposed thereon as it exists at bus 32. This figure shows the superposition effect of adding the instantaneous carrier voltage to the gigabit data signal 36. If the subchannel carrier happens to have a positive voltage at the time interval represented by waveform 36, the resulting sum waveform is as shown at 38. If the subchannel carrier happens to have a negative voltage at the time interval represented by waveform 36, the resulting waveform on line 30 is represented by dotted line 41. Note how the superposition increases or decreases the voltage level of the logic 1 and logic 0 levels as well as alters the times of the zero crossings.

Figure 3:
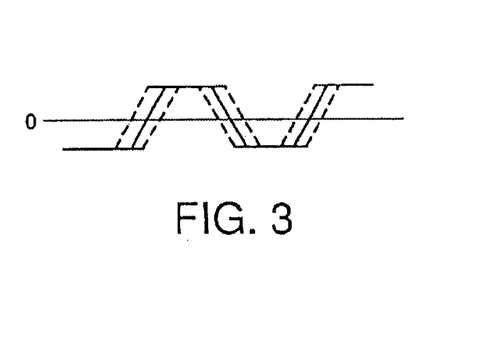
FIG. 3 shows the resulting pulse width modulation after the waveform of FIG. 2 is passed through a digital buffer.

FIG. 3 shows what happens when such a signal is passed through a digital buffer. Note how the digital buffers such as electrical-to-optical transducer/digital buffer 10 removes all perturbation of the logic 1 and logic 0 voltage levels but the perturbations of the zero crossing times pass through the buffer unchanged. The subchannel data is encoded in the perturbations of the zero crossing times.

One of the problems with the prior subchannel transceiver arrangements designed by the assignee is that manufacturing tolerances of the slew rate of the gigabit transmitter 29 caused unpredictable changes in the intensity of the subchannel modulation. The intensity of the subchannel pulse width modulation changes with the rise time of the gigabit data signal. This is because the intensity of the subchannel pulse width modulation is proportional to the ratio between the slew rate and the subchannel carrier voltage. Faster slew rates reduce the degree of deviation of the zero crossing for a given subchannel carrier voltage. Thus, if the slew rate were to be consistently faster, a higher subchannel carrier voltage could be applied to achieve the desired degree of deviation of the pulse width modulation. The problem with the prior design was that from one gigabit transmitter chip set to the next, the slew rate/rise time would change. This meant that with a fixed subchannel carrier voltage excessive zero crossing deviation would be produced in some units and not enough in others. Not enough deviation of the time of the zero crossings is a problem because the subchannel data cannot be recovered from the noise. Too much deviation of the time of the zero crossings is a problem because it is interpreted as jitter in the gigabit receiver and can cause loss of synchronization. There is a jitter budget in the gigabit receivers, but too much subchannel carrier voltage or any other factor that results in too much deviation of zero crossings will interfere with the reliability of the gigabit data transmissions.

As a measure of the degree of this problem, a 2:1 variation in the rise time from one gigabit transmitter to the next translates into a 6 dB uncertainty in the strength of the subchannel signal.

The combined signal on line 32, as modified by the digital buffer 10 (if present) propagates on fiber or copper media 34 to the receiver side. There another optional digital buffer 12 converts the signal from light to electrical. If buffer 12 is not present, it usually will be in embodiments where media 34 is some form of copper media. The output 40 of the buffer 12 is coupled to the input of gigabit data receiver 16 as well as to the input of a low pass filter 42. In alternative embodiments, an optional digital buffer 43 can be interposed between line 40 and the input to the low pass filter 42 functioning to isolate the filter 42 and minimize loading down of the high data signal on line 40 by the presence of the subchannel receiver. The function of the low pass filter 42 is to pass the subchannel freuqency components while rejecting most of the high speed data frequency components. Since the subchannel carrier is nominally at approximately 1 MHz, the low pass filter 42 is designed to have an upper rolloff frequency which is usually between 2 and 5 MHz. The preferred 3 dB upper corner frequency is 1.6 MHz although this upper corner frequency is not particularly sensitive. This corner frequency will cause some attenuation at the subchannel carrier frequency, but the intensity of the subchannel FSK modulation is selected to be high enough that the attenuation is not a problem.

Typically, the subchannel receiver will be shared between multiple ports in a hub or switch, but there will be a gigabit receiver 16 and a low pass filter 42 for every port. The output of the low pass filter is coupled through an optional amplifier 44 to one input of a receiver port selector multiplexer 46. Each port will be coupled to one of the ports of this multiplexer. The output of the multiplexer is coupled to the input of the subchannel receiver 23 which functions to recover the subchannel data from the frequency shift keyed subchannel carrier signal output by the low pass filter 42, and output it in, typically, a 9600 baud serial data stream, on line 48. This serial data stream is converted back to a parallel data format on bus 45 by optional UART 49.

The Preferred Subchannel FSK Transmitter

FIG. 4 is a block diagram of the preferred FSK digital subchannel transmitter custom circuit. In addition to the availability of commerically available FSK integrated circuits to perform this function, the FSK modulation of the subchannel data onto a subchannel carrier could also be implemented using a programmable digital signal processor. The control program would simply repeatedly read the logic state of the incoming subchannel data and call either a Mark or Space subroutine to generate an output carrier signal at the proper Mark or Space frequency. Preferably, software interrupts would be used to call the routines immediately upon a change in the logic state of the subchannel data. If a programmable digital signal processor with an on board digital-to-analog converter is used, the function of the optional variable attenuator 70 can also be implemented on the DSP. The DSP embodiment is symbolized by dashed line 47.

The embodiment depicted in FIG. 4 is comprised of a divide-by-48 counter 49 which receives at its clock input 51 a clock signal which is 48 times the subchannel carrier frequency, $F_c$. Absent any modulation, during one cycle of the subchannel carrier, the counter 49 will output on line 53 a square wave whose positive half cycles, represented by half cycle 50 in FIG. 5, and negative half cycles, represented by half cycle 52 in FIG. 5, each have a duration of 24 clock periods. Since the Mark and Space frequencies only vary the subchannel carrier frequency by one part in forty, this presents some complications since neither the Mark nor Space period is an integer number of clock-cycles. The clock frequency 48*$F_c$ was chosen because it can be generated by a standard crystal and is convenient in implementing the subchannel FSK receiver/demodulator. In one alternative embodiment, the clock frequency is an integer multiple of both the Mark and Space frequencies, and a divider with a variable divide ratio is switched to divide the clock frequency down to the Mark frequency or the Space frequency appropriately based upon the input data. In another alternative embodiment, a numerically controlled oscillator (also known as a direct digital synthesizer) may be used to generate both the Mark and Space frequencies directly simply by changing the control bits which control the output frequency. Likewise, the Mark and Space carrier frequencies could also be generated by two separate Mark and Space frequencies oscillators with a switch that multiplexes between them based upon the subchannel input data.

In the preferred embodiment, the Mark frequency is generated by causing the divide by 48 counter 49 to experience an extra count every 40 clocks. Thus, every 40 clocks of the clock on line 51, there will be an extra count transition on line 53 over the number of transitions that would have occurred if no FSK modulation was present. Thus, over the 1920 clock cycles of the clock on line 51 that it would normally take to output 40 cycles of the subchannel carrier square wave shown generally at 54 in FIG. 5, 41 cycles of the subchannel carrier signal will be counted out on output line 53 thereby defining the Mark. frequency, as shown at 56.

Figure 5:
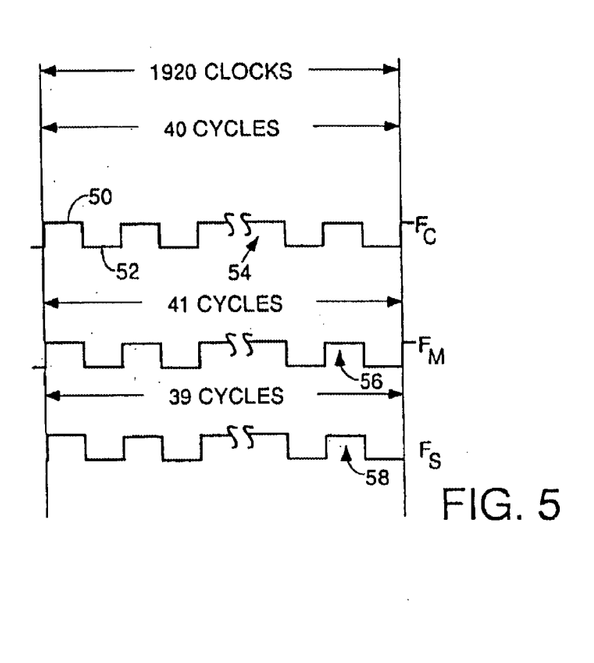
FIG. 5 is a timing diagram that shows how the Mark and Space frequencies for the subchannel/carrier are generated over the interval of 1920 clocks.

Likewise, the Space frequency is generated by causing the counter 49 to skip a count every 40 clocks of the high speed clock on line 51. Thus, over the interval of the 1920 clock cycles that it normally takes to count out 40 cycles of unmodulated subchannel carrier, only 39 cycles of subchannel carrier will be counted out on line 53 thereby defining a Space frequency, as shown at 58.

These two FSK modulation operations are done using divide-by-40 counter 55 and AND gates 57 and 59. When counter 55 reaches a count of 40, it activates line 61. If the subchannel data on line 63 is a one at that time, a Mark frequency must be generated so the extra cycle of the subchannel carrier must be produced over the interval of 1920 clocks on line 51. Since the subchannel data is logic one, and line 61 is a one, AND gate 57 drives line 65 to logic 1. This causes the counter output on line 53 to advance by two counts on the next transition of the clock on line 51. If the subchannel data is logic 0 at the time line 61 is activated, then inverter 69 drives the input to gate 59 to logic 1 at the same time line 61 is logic 1. This causes gate 59 to drive line 67 to logic 1. This causes counter 49 to skip a count on the next transition of the clock on line 51. These extra counts and skipped counts every 40 clock cycles of the clock on line 51 are how the Mark and Space frequencies are generated over the interval of 1920 clock cycles.

An optional variable attenuator 70 is used to provide a selectable amount of attenuation of the amplitude of the subchannel carrier signal. If the type of media 34 is known and never will change, the amplitude of the subchannel carrier can be fixed by a fixed attenuator to give the desired degree of pulse width modulation intensity. However, if the amplitude of the subchannel carrier signal is set to achieve the desired amount of pulse width modulation for a fiber media and the type of media is changed to copper, some additional attenuation must be added to avoid excessive pulse width modulation induced jitter at the gigabit data receiver causing possible loss of synchronization. This excessive jitter is caused by the switch to copper because of the higher losses in copper than fiber for gigabit signals causes by more leakage of the high frequency components through parasitic capacitances to ground and skin effect losses. The higher losses slows the rise times for the gigabit data, but the higher losses do not affect the lower frequency components of the subchannel signal as much. Thus, at the receiver, the superposition of the slower rise time gigabit data and the unattenuated subchannel causes excessive PWM. Variable attenuator 70 can be adjusted to reduce the amount of PWM at the gigabit receiver if copper media is substituted. The programmable attenuator is used in the embodiments disclosed in the parent case for the same reason.

An optional passive bandpass filter 72 is used to pass the fundamental of the subchannel carrier and reject the third harmonic and a sufficient number of the spurious frequency components caused by the irregular subchannel waveform. The bandpass filter rounds off the eges of the square wave of the subchannel carrier. If the bandpass filter is not used, at least a low pass filter that can suppress the third harmonic and control the slew rate of the subchannel carrier to be less than instantaneous should be used. A bandpass filter is preferred because it has at least two-poles and can be designed to provide very small or no attenuation at the subchannel carrier frequency and significant attenuation at the third harmonic frequency which is the desired characteristic. A simple one-pole low pass filter cannot be made to have this characteristic since even if the upper corner frequency is set at 1.5 times the subchannel carrier frequency, there will still be one or two dB attenuation at the subchannel carrier frequency and not as much attenuation at the 3rd harmonic.

An instantaneous slew rate of a subchannel carrier square wave could have an unpredictable effect on the clock recovery process in the gigabit receiver by causing the pulse width modulation zero crossing to jump too suddenly from one position to another thereby causing a possible loss of synchronization.

The Digital Subchannel Receiver

Figure 6:
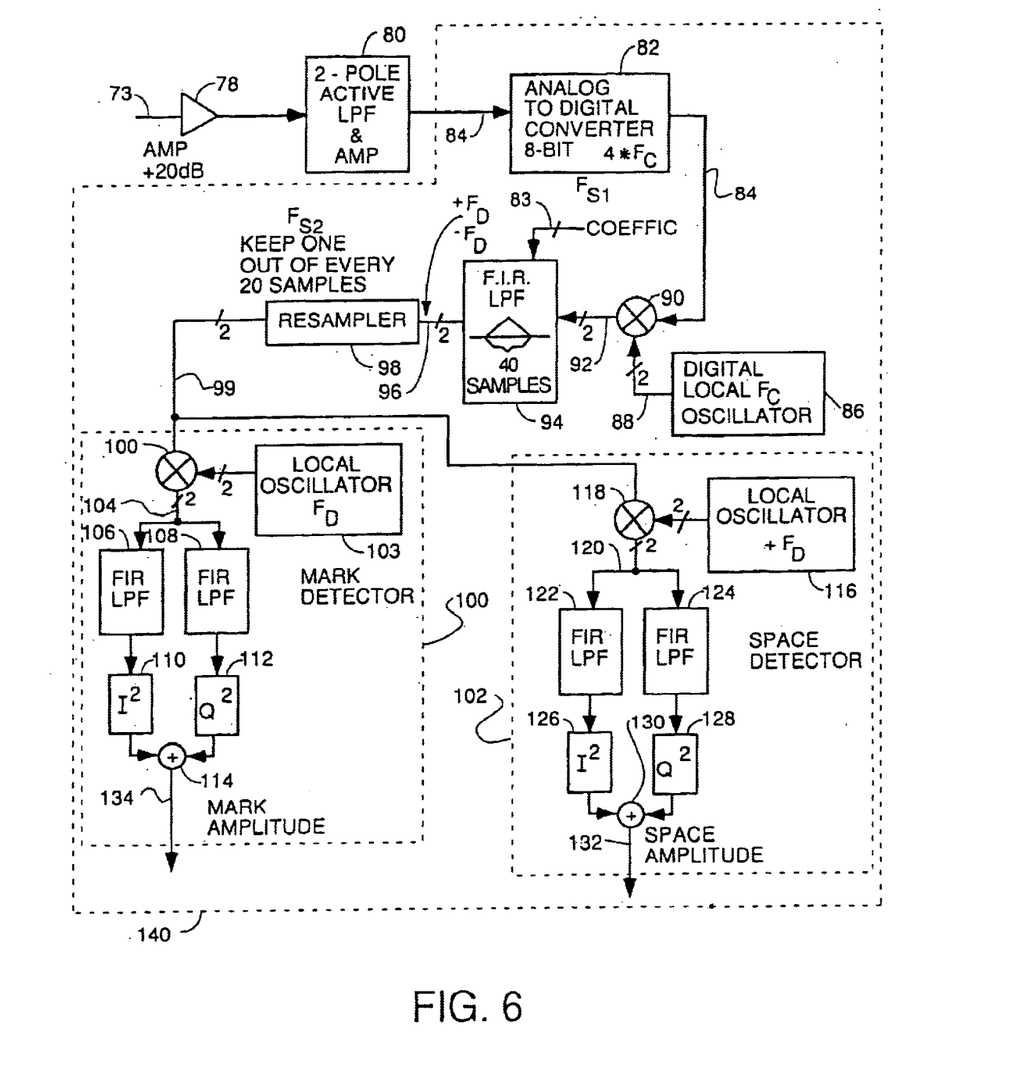
FIG. 6 is a block diagram of the preferred form of subchannel receiver to detect Mark and Space frequencies using narrow passband digital IF bandpass filters and separate detectors using digital filters designed to detect the relative intensity of Mark and Space frequencies in the output of the narrow passband IF filter.

The subchannel receiver 23 in FIG. 1 is shown in more detail in FIG. 6. The embodiment shown in FIG. 6 is a custom, discrete implementation of digital signal processing circuitry that is relatively simple and inexpensive. In other embodiments, commercially available digital FSK receiver chips can be used. In still other embodiments, a programmable digital signal processor programmed to perform the functions to be described below in the sequence defined below can also be used, as represented by dashed line 140. If the DSP chip has an on-board analog-to-digital converter, the function of A/D converter 82 can be performed on-board the DSP chip.

The low level filtered analog subchannel signal on line 73 in FIG. 1 is input to an amplifier 78 which provides a +20 dB amplification. The output of the amplifier is coupled to the input of a 2-pole active low pass filter and amplifier 80. The mark and space frequencies are $120+-3)*F_b$ where $F_b$ is the baud rate. The first order center frequency of filter 80 in one embodiment is $120*F_b$, and the Q of the filter is 3.5.

The output of filter 80 is coupled to the input of an analog to digital converter with an 8-bit sample output and a sample rate of $4*F_c$, i.e., 4 times the subchannel carrier frequency. The sample rate is also 480 times the baud rate and ¼ the clock rate. The deviation frequency $F_d$ is 1/160 of the sample rate. The Nyquist frequency is therefore $2*F_c$, and any signal that appears at the input 84 of the ADC 82 at $3*F_c$ would be indistinguishable as an alias of a signal at $F_c$. The purpose the active filter 80 is, among other things, to function as an anti-aliasing filter. The purpose of the amplifier 78 and amplification in the active filter is to provide an amplitude for the subchannel signal at the input of the ADC 82 which approximately matches the full scale range of the ADC to maximize the resolution of the steps. The active filter 80 also act as a buffer to drive the high capacitance of the input of the ADC 82. The active filter anti-aliasing function selectively attenuates alias signals at $3*F_c$ and $5*F_c$.

By converting the subchannel signal to digital samples, the entire frequency domain is reduced to the frequencies between zero and half the sample frequency. Conversion to digital also allows the use of a very narrow passband digital filter to perform two functions. The filter functions to reject all signals except signals very close to the subchannel frequency in a first stage to give extremely good receiver sensitivity and selectivity in the presence of noise. In a second stage, the filter works in conjunction with a local oscillator and mixer to discriminate between the Mark and Space frequencies so as to demodulate the subchannel carrier.

The output samples from ADC 82 on line 84 digitally define a frequency spectrum that contains the subchannel data. This spectrum contains a Mark frequency at the subchannel carrier frequency plus the deviation frequency caused by the subchannel Mark bits and a Space frequency at the subchannel carrier frequency minus the deviation frequency caused by the subchannel Space bits. A local oscillator 86 generates a quadrature digital signal that defines a phasor having the subchannel carrier frequency $F_c$. The phasor is defined by an exponential with a magnitude (defining the inphase component) and the exponential defines the quadrature component with the quadrature component lagging in phase behind the inphase component. This phasor is defined by a digital signal on the imaginary component line of bus 88 which varies from 0 to +1 to 0 to −1 over one cycle. In other words, the local oscillator 86 outputs a complex signal Lo1(n)=lo1_i(n) and lo1_q(n). These are the real and complex components of $1.0*exp(-j*wc*n)$, where the radian frequency wc=e*pi*fs¼. Numerically, these signals repeat with a period of 4 samples: (i,q)=(1,0), (0,−1), (−1,0), (0,1). In other words, the digital signal on the real component line of bus 88 varies from +1 to 0 to −1 to 0 so as to be in a quadrature-phase relationship to the square wave defined by the imaginary component. Thus, multiplication by lo1 is simply addition or subtraction of an i or q term.

These two local oscillator quadrature waveforms are each multiplied by a mixer 90 times the sample values on bus 84. The function of the mixer is to shift the subcarrier signal to baseband. Each sample is multiplied by the imaginary component on bus 88 to generate an imaginary output component on 2-wire bus 92. The complex result is ifi(n)= rf_in(n)*l01(n) where rf_in(n) is the sample stream output from the analog to digital converter. In other words, each sample is multiplied by the real component and the imaginary component on bus 88 to generate a real component and an imaginary component on the inphase and quadrature wires, respectively, of 2-wire bus 92. The multiplications are simple since the local oscillator value varies between 0 to +1 to −1 so the multiplication involves only sign changes and setting to zero of the values of certain samples arriving when the real or imaginary components are 0 at certain times during the local oscillator cycle. The Mark and Space frequencies are + and $−3*F_b$ or + and $−F_s$1/160.

The mixing process creates sum and difference sideband frequencies which are digitally represented as complex quadrature signals on 2-wire bus 92 at the output of the mixer 90. The sum frequencies are generally at twice the subchannel carrier frequency and will be rejected by digital finite impulse response filter 94 which receives the mix products. The difference frequencies are the frequencies of interest since they are generally at baseband since the subchannel carrier frequency has been generally removed. The lowpass filter 94 has a passband that extends from zero to generally between 6 and 12 times the baud rate, $F_b$. The output data stream on bus 96, because of the peculiarities of digital signal processing of complex number representations of frequencies will have only two frequencies, $+F_D$ (the positive deviation frequency) when a Mark is being received, and $-F_D$ (a negative frequency equal to the deviation frequency) when a Space is being received.

The FIR low pass filter 94 has a triangular impulse response in the time domain in the preferred embodiment, which is the best transfer function for performing antialiasing prior to resampling by resampler. The resampler 98 resamples at the lower rate $F_s2=F_s\frac{1}{20}=24*F_b=F_c/5$. This triangular transfer function is defined by a series of 40 coefficients which are stored in the FIR or which can be supplied from a register or other memory not shown via bus 83. The impulse response of filter 94 is f2__ir(n) and the result is if1f(n)=convolution (if1(n), fe__ir(n)).

The difference frequency sideband on bus 92 will contain a Mark frequency component at the deviation frequency $F_D$ where the input Mark frequency $F_M$ at the input to the mixer was $F_M=F_C+F_D$. The difference frequency sideband will also contain a Space frequency $F_{SP}=-F_D$ where the input spectrum to the mixer contained a Space frequency $F_{SP}=(F_C-F_D)$. The corner frequency of the digital low pass filter 94 is set at $2*F_D$ in one embodiment so the upper sideband or sum frequencies are rejected and the output bus 96 contains samples of quadrature waveforms that define only plus and minus deviation frequencies which define the Mark and Space bits of the subchannel carrier. The reason the mixing and filtering was done in the complex, quadrature domain is so that positive Mark frequencies could be distinguished from negative Space frequencies in the samples output from the mixer where the subchannel unmodulated carrier frequency component has been removed. In other words, the difference frequency sideband will be centered on D.C. or zero frequency and have a positive $F_D$ component representing the Mark bits over time and a negative $F_D$ component representing the Space bits over time. The FIR low pass filter 94 is really two FIR filters, one for real and one for imaginary components. These FIR low pass filters pass only the difference frequencies around zero and reject the sum frequencies and a great deal of noise thereby giving the receiver great sensitivity and selectivity.

The output of the FIR filter 94 is resampled at a much a lower rate $F_s2$ in resampler 98. The resampler resamples the data at a rate which is 1/20 of the sample rate of the analog-to-digital converter 82. The purpose of resampling is to reduce the amount of computation that needs to be done in the Mark and Space detectors that follow. Since the frequencies that remain after mixing are very close to D.C., there is no need for a high sample rate. Fewer samples means less computation and simpler circuitry and software.

In the preferred embodiment, the functionality of the resampler 98 and the FIR filter are combined to save computation in the FIR filter. This is done to save computation in the FIR filter by computing only every 20th output sample instead of all of them. This is done by using one line of computational circuitry that multiplies each of 40 samples times the 40 coefficients and sums the partial products in an accumulator, and another parallel line of computational circuitry that multiplies another block of 40 samples on bus. 92 times the 40 coefficients and accumulates the partial products in a second accumulator. This second block of 40 samples is separated in time in the sample stream on bus 92 from the first block of 40 samples by 20 samples. In alternative embodiments, the FIR filter 94 could compute every sample, and the resampler 98 could simply select every 20th sample and throw the rest away.

The result of the resampling is the complex sequence if__fs2(m)=if1f(n), where n=20*m. The "m" will be used to designate all discrete time variables at the lower second sample rate $F_s2$.

In the if__fs2 signal, the Mark and Space frequencies are + and $-F_s2/8$. Instead of using bandpass filters for both the Mark and Space frequencies, which could be done in alternative embodiments, another local oscillator will be used for each of the Mark and Space frequencies to shift them to baseband or zero frequency and then digital lowpass filters (or analog low pass filters with suitable conversion back to analog representation) will be used. This implementation is simplified by the fact that the Mark and Space frequencies are negatives of each other.

To implement this approach, the complex output 99 of the resampler is applied to the inputs of a Mark detector 100 and a Space detector 102. The function of the Mark and Space detectors is to filter out just the frequency components representing Mark and Space bits and determine the relative amplitudes at any particular time. Whichever detector has the higher amplitude output is deemed to represent the actual bit that was transmitted. Both the Mark and Space detectors function by mixing the resampled output with a $-F_D$ or $+F_D$ local oscillator signal, which shifts the target frequency to D.C., and filtering the results in a digital FIR lowpass filter. After filtering, the amplitude of the result is determined by squaring and summing the amplitudes of the inphase and quadrature (real and imaginary) components. The bandwidth of the lowpass filters 106, 108, 122, and 124 is, in the preferred embodiment, variable to accomodate faster or slower baud rates for the subchannel data.

More specifically, in the Mark detector, the output of the resampler is multiplied (complex number multiplication) in mixer 100 by a complex (quadrature) phasor representing a digital local oscillator signal, said signal taking the form of a sample stream representing a frequency of $-F_D$ generated by local oscillator 103. The notation for the output of the local oscillator is lo2(m)=lo2__i(m) for the inphase part and lo2__q(m) for the quadrature part. Like the first local oscillator, this complex phasor is a unit amplitude complex exponential at frequency $-F_s2/8$. Unfortunately, not all the terms are plus or minus 1 or 0; half the samples have i or q absolute values at 0.7071.

The Mark detect product on bus 104 output by mixer 100 is mp(m)=if__fs2(m)*lo2(m) and will have a frequency of zero for a Mark and $-F_s2/4$ for a Space. Mixing by complex number multiplication results in generation of the sum product and no difference product is generated. Thus, the result of this mixing is to move the frequency of a Space $-F_D$ to a frequency of $-2*F_D$ ($-F_D+(-F_D)=-2*F_D$) on output line 104 as the sum product and having some amplitude representing the intensity of the Space signal received. Likewise, if a Mark signal at frequency $+F_D$ is received on bus 99, its frequency is moved 0, i.e., ($+F_D+(-F_D)=0$) but the result will have some amplitude representing the intensity of the Mark signal received. The individual product terms are:

mp__ii=if__fs2__i*lo2__i
mp__iq=if__fs2__i*lo2__q
mp__qi=if__fs2__q*lo2__i
mp__qq=if__fs2__q*lo2__q.

These individual product terms are combined to form the complex product terms mp__i=mp__ii−mp__qq
mp__q=mp__iq+mp__qi The corresponding Space product would be formed using the complex conjugate of lo2, or simply sp__i=mp__ii+mp__qq
sp__q=−mp__iq+mp__qi.

Two narrow lowpass (or bandpass in some embodiments) FIR filters 106 and 108 filter the inphase and quadrature components output on bus 104 from the mixer 100. The lowpass filters of the preferred embodiment for the Mark and Space frequencies have a bandwith of approximately $1*F_b=F_s2/24$. These lowpass filters are preferably 24 point FIR filters with triangular impulse response with the 24 coefficients being programmable so as to adjust the bandwidth of the filter to account for faster or slower baud rates of the subchannel data.

Conceptually, the lowpass filter of the Mark and Space power detector is applied to mp(m) and sp(m), although, with the same amount of calculation, it can be applied to the individual product terms. In either case, the impulse response of the filter is f3__ir(m) and the outputs are mpf(m) =convolution (mp(m), f3__ir(m) and spf(m)=convolution (mp(m), f3__ir(m)). If f3__ir is nonzero for more than 24 samples, the filter creates intersymbol interference.

In alternative embodiments, the two filters used for each of the inphase and quadrature components in each of the Mark and Space detectors are bandpass filters. The two bandpass filters for the Mark detector have a transfer function in the frequency domain that defines a passband centered on 0 frequency where the Mark signal will be moved by the mixing process. This passband is not wide enough to pass frequencies at $-2*F_D$ So if a Space frequency is present on bus 99, its mix product at $-2*F_D$ on bus 104 will be rejected. If samples encoding a Mark frequency is present on bus 99, the mix product on bus 104 will pass through the FIR filters 106 and 108 without significant attenuation. The mixer 100, FIRs 106 and 108 and the local oscillator are of conventional digital signal processing design. Any conventional design which can accomplish the functions defined herein for each digital signal processing component will suffice to practice the invention. Specific designs are given in the following treatises and databooks which are hereby incorporated by reference: Elliott, *Handbook of Digital Signal Processing Engineering Applications*, Academic Press, Inc., San Diego, ISBN 0-12-237075-9, TK5102.5.H32 (1987); Oppenheim & Schafer, Discrete Signal Processing, Prentice Hall, Englewood Cliffs, N.J. 07632, ISBN 0-13-216292-X, TK5102.5.02452 (1989); *Digital Signal Processing Databook*, Harris Semiconductor, (1994).

An indication of the amplitude of the frequency components passed through FIR filters 106 and 108 is generated by squaring devices 110 and 112 and summer 114. The power of a signal having a real (inphase) and imaginary (quadrature) axis component is equal to the sum of the squares of the real and imaginary components. Device 110 calculates the square of the inphase component, and device 112 calculates the square of the quadrature component. This forms mpp(m) and spp(m) which are the power (squared magnitude) of the complex input. Specifically, mpp=abs (mpf)^2=mpf__i*mpf__i +mpf__q*mpf__q and similarly for spp. Summer 114 adds the squares of the inphase and quadrature components and the output is used as an indication of the power of the frequency components that have passed through the FIR filters. Typically, a comparator (not shown) receives both outputs and determines which of the output signals on lines 132 and 134 is greater and outputs either a Mark or Space bit on bus 48 to UART 49. UART 49 resamples the output at $F_b=F_s2/24$.

The Space detector 102 works the same way as the Mark detector except that the local oscillator 116 generates a complex phasor representation of a local oscillator signal at a frequency $+F_D$. When multiplied in mixer 118 times the incoming sample data for the inphase and quadrature components on bus 99 for a Space frequency at $-F_D$, the resulting mix product is at 0 frequency $(-F_D+(+F_D))$ with an amplitude representitive of the intensity of the Space signal being received. If the local oscillator signal is mixed with a Mark frequency at $+F_D$, the mix product on bus 120 is at frequency $2*F_D$. The FIR filters 122 and 124 have coefficients which define a narrow passband centered on zero frequency so as to pass any Space frequency mix product but not wide enough to pass any Mark frequency mix product at $2*F_D$. Squaring devices 126 and 128 calculate the squares of the inphase and quadrature components, and summer 130 sums the squares to generate an indication on bus 132 of the power of the signal received. If the subchannel carrier frequency is at the Space frequency, the signal on line 132 will be greater than the signal on line 134. If the subchannel carrier frequency is at the Mark frequency, the signal on line 134 will be greater than the signal on line 132. These differences are used by a comparator (not shown) to re-generate digital data replicating the original data fed to the subchannel transmitter.

Figure 7:
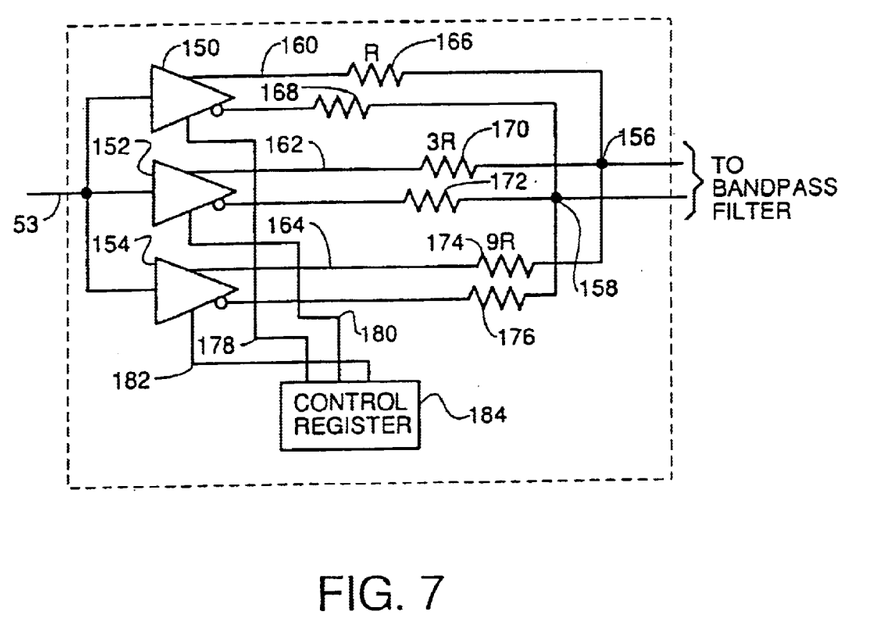
FIG. 7 is a block diagram of the preferred form of variable attenuator.

Referring to FIG. 7, there is shown a block diagram of the preferred form for the optional variable attenuator 70 in FIG. 4. The attenuator receives the FSK modulated square wave output signal on line 53 and applies it simultaneously to the inputs of three complementary output signal buffers 150, 152 and 154. Each of these buffers has a true and complement output signal which is coupled through a resistor to one of two summing junctions 156 and 158. All the true outputs 160, 162 and 164 are coupled through their resistors to summing junction 156. All the complementary signal outputs are coupled to summing junction 158. The values of the two resistors 166 and 168 are set at some value R. The values of the two resistors 170 and 172 are set at a value of 3R or three times higher than R. The values of the two resistors 174 and 176 are set at 9R or nine times higher than R. Each of the buffers receives control bits on buses 178, 180 and 182, respectively. The control bits are stored in a control register 184 and can be changed by any known means. The control bits on bus 178 can control buffer 150 so as to be on or off. The control bits on bus 180 can control buffer 152 to be on or off or invert the signal. The control bits on bus 182 can control buffer 154 to be on or off or invert the signal. By managing the control bits, 13 different attenuation levels can be obtained.

There is a way to simplify the demodulator shown in FIG. 6 such that separate local oscillators need not be used for the Mark and Space detectors and to simplify the computations needed for Mark and Space detections. Namely, there is available some extra economy of computation that arises from the fact that the Mark and Space frequencies are equal and opposite sign frequencies $+F_D$ and $-F_D$ at the output of the first mixer 90 and the FIR low pass filter 94.

Because of the symmetry, there is a way to reduce the amount of hardware needed. For example, the outputs of the Space detector local oscillator 116 can be obtained from the Mark detector local oscillator 102 by simply changing the sign of the imaginary component. The same goes for the mixer 118 and low-pass filter comprised of FIR bandpass filters 122 and 124, if we defer the combination of partial products.

"Deferring the combination of partial products" needs some explaining. We start with the Mark detector case.

The complex IF signal after re-sampling in the resampler 98 is:

if_fs2(m),
a complex sequence with the following real and imaginary parts
   if_fs2_i(m) and if_fs2_q(m),
   where:
      "if_fs2" means intermediate frequency signal at sample rate fs2, and where i and q stand for "in-phase" and "quadrature", which are the traditional names of real and imaginary components in complex signal processing.
      "m" is the subscript identifying each sample in the sequence.

Now, the second complex local oscillator, 116, generates the sequence
   lo2(m)
with real and imaginary parts lo2_i(m) and lo2_q(m).

Similar to the output of the first local oscillator 102 in the Mark detector the output of local oscillator 116 is a unit-amplitude complex exponential at frequency −Fs*2/8.

The Mark detect product mp(m) =if_fs2(m)*lo2(m) will have a frequency of zero for a Mark and −Fs2/4 for a Space. The individual product terms are:
   mp_ii=if_fs2_i*lo2_i
   mp_iq=if_fs2_i*lo2_q
   mp_qi=if_fs2_q*lo2_i
   mp_qq=if_fs2_q*lo2_q
They are combined to form the complex product terms
   mp_i=mp_ii−mp_qq
   mp_q=mp_iq+mp_qi
The corresponding Space product sp(m) would be formed using the complex conjugate of the complex product terms just detailed, or simply:
   sp_i=mp_ii+mp_qq
   sp_q=−mp_iq+mp_qi This calculation can be done in a programmed digital signal processor to replace both of the local oscillators 102 and 116 and mixers 100 and 118, or a single local oscillator and mixer can be used and the calculation described above can be made in a DSP chip or other circuitry to replace the other local oscillator and mixer.

The next stage of the demodulator is a lowpass filter or bandpass filter shown in the mark detector as comprised of FIR bandpass filters 106 and 108, with a bandwidth of approximately $1*F_b$=Fs2/24. Conceptually this filter is applied to mp(m) and sp(m), although with the same amount of computation it can be applied to the individual product terms.

Here is what we mean by deferring the combination of partial products. Compute the partial products mp_ii, mp_iq, mp_qi, and mp_qq as given above. Apply the lowpass or bandpass filter to each (a lowpass filter will be assumed), giving the results:
   lpf(mp_ii), lpf(mp_iq), lpf(mp_qi), and lpf(mp_qq).
Now we can combine the FILTERED partial products to get the Mark detector signal
   lpf(mp_i)=lpf(mp_ii)−lpf(mp_qq)
   lpf(mp_q)=lpf(mp_iq)+lpf(mp_qi)
To get the Space detector signal, simply compute
   lpf(sp_i)=lpf(mp_ii)+lpf(mp_qq)
   lpf(sp_q)=−lpf(mp_iq)+lpf(mp_qi)
That is a significant savings because the lpf computation is relatively intensive, and is shared by both the Mark and Space detectors.

In actual ASIC impementations the same results can be achieved without the optimization just described. Specifically, Mark and Space local oscillators, mixers, and lowpass or bandpass filters can each be implemented using independent hardware.

DSP computation for this application is relatively undemanding so any algorithm which does separate calculations for each of the mark and space detectors or which uses the optimizations just described to cut down on computation will suffice to practice the invention.

Other modifications of the described technology will also be apparent to those skilled in the art without departing from the spirit and scope of the invention. For example, analog or digital low pass filters (LPF) instead of digital FIR (Finite Impulse Response) filters can be used in wherever a digital filter is shown with suitable digital-to-analog conversion in cases where analog filters are used. An LPF does not have to be an FIR filter, and an FIR filter does not have to be an LPF. It has been found in actual service that a 40-point triangular FIR filter response works well for filter 94 although a rectangular filter response would also work in alternative embodiments. The low pass FIR filters in the Mark and Space detectors are current 24 coefficient filters, but improved response with a larger number of coefficients.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus comprising:
   a media for carrying high speed digital data from a high speed digital data transmitter to a high speed digital data receiver;
   a subchannel transmitter having an output coupled to said media and having an input for receiving subchannel data which is separate from and at a much lower baud rate than said high speed digital data and including a modulator which modulates such subchannel data onto a host signal for propagation across said media;
   a subchannel receiver having an input coupled to said media through a means for passing the frequency components of the subchannel data spectrum but not passing the frequency components of the high speed data spectrum, and having an amplifier that amplifies the output of said low pass filter and having a mixer and local oscillator that combine to mix the frequencies output by said amplifier down to an intermediate frequency, and having a bandpass filter for filtering the intermediate frequency signal using a passband which is centered on said intermediate frequency and which has a bandwidth which is wide enough to encompass enough of the frequency components of the subchannel data spectrum and exclude enough of the frequency components of the high speed data signal to provide adequate sensitivity and selectivity of said subchannel receiver to detect said subchannel data signal despite manufacture lot variations in the rise times of said high speed data signals, and having one or more detectors to detect the subchannel data.

2. The apparatus of claim 1 wherein said subchannel transmitter comprises:
   a clock generating a clock signal that has a frequency $48*F_C$, where $F_C$ is the desired subchannel carrier frequency;
   a divide-by-48 counter having an input for receiving said clock signal and having a count-up-by-two input for receiving a signal, which when activated, causes the counter to count up by two on the next clock pulse, and having a skip-a-count input for receiving a signal that causes said counter to skip a count on the next clock pulse;

a divide-by-40 counter having a clock input coupled to receive said clock signal and having a count output;

a first AND gate having a first input coupled to receive said subchannel data and having a second input coupled to said output of said divide-by-40 counter and having an output coupled to said count-up-by two input;

an inverter having an input coupled to receive said subchannel data and having an output;

a second AND gate having a first input coupled to said output of said inverter and having a second input coupled to said output of said divide-by-40 counter and having an output coupled to said skip-a-count input; and a bandpass filter or lowpass filter coupled to filter the output of said divide-by-48 counter with a passband selected to pass the subchannel carrier fundamental but reject most of the spurious frequency components caused by the irregular waveform output by said divide-by-48 counter and to reject the third harmonic of the subchannel carrier and to round off the edges of the square wave signal so as to not cause excessively fast jumps in the zero crossing times of said high speed data signal caused by said subchannel modulation.

3. The apparatus of claim 2 further comprising a variable attenuator coupled to attenuate the amplitude of the output signal from said divide-by-48 counter by a selectable amount prior to filtering.

4. The apparatus of claim 2 wherein said subchannel receiver comprises:

a low pass filter coupled to said media and having a transfer function defining a passband which provides a high impedance to the majority of the frequency components above the subchannel carrier frequency but a low impedance, lower than the high impedance, to the frequency components of the modulated subchannel signal;

a first amplifier coupled to receive the output signal from said low pass filter;

an analog-to-digital converter having an input for receiving a signal to be converted to digital samples, and having an output at which said digital samples appear, said input having a parasitic capacitive load coupled thereto;

a two-pole active low pass filter and amplifier circuit coupled to receive the output of said first amplifier and having a transfer function suitable for performing an anti-aliasing function to eliminate or suppress the third and fifth harmonics of said subchannel carrier frequency, and functioning to buffer and amplify the signal from said first amplifier so as to drive said input including the parasitic capacitance load of said input of said analog-to-digital converter to voltages which cover all the full dynamic range of said converter;

a mixer coupled to receive said samples and having an input for data that defines a quadrature local oscillator signal having the subchannel carrier frequency;

a local oscillator for transmitting to said local oscillator input of said mixer digital data defining a quadrature local oscillator signal at the frequency of said subchannel carrier;

a digital bandpass filter with filter coefficients which establish a narrow passband which is centered on said subchannel carrier frequency and with a bandwidth wide enough to pass enough frequency components of said subchannel data spectrum to allow adequate reception of said subchannel data and which rejects the majority of frequency components of said high speed data spectrum;

means for detecting an amplitude of mark and space frequency signals in the output signal from said digital bandpass filter.

5. The apparatus of claim 4 further comprising a resampler circuit coupled to the output of said digital bandpass filter and having an output coupled to an input of said means for detecting the relative amplitude of mark and space frequencies.

6. A subchannel data transmitter, comprising:

a clock generating a clock signal that has a frequency $48*F_C$, where $F_C$ is the desired subchannel carrier frequency;

a divide-by-48 counter having an input for receiving said clock signal and having a count-up-by-two input for receiving a signal, which when activated, causes the counter to count up by two on the next clock pulse, and having a skip-a-count input for receiving a signal that causes said counter to skip a count on the next clock pulse;

a divide-by-40 counter having a clock input coupled to receive said clock signal and having a count output;

a first AND gate having a first input coupled to receive said subchannel data and having a second input coupled to said output of said divide-by-40 counter and having an output coupled to said count-up-by two input;

an inverter having an input coupled to receive said subchannel data and having an output;

a second AND gate having a first input coupled to said output of said inverter and having a second input coupled to said output of said divide-by-40 counter and having an output coupled to said skip-a-count input; and a bandpass filter or lowpass filter coupled to filter the output of said divide-by-48 counter with a passband selected to pass the subchannel carrier fundamental but reject most of the spurious frequency components caused by the irregular waveform output by said divide-by-48 counter and to reject the third harmonic of the subchannel carrier and to round off the edges of the square wave signal so as to not cause excessively fast jumps in the zero crossing times of said high speed data signal caused by said subchannel modulation.

7. The apparatus of claim 6 further comprising a variable attenuator coupled to attenuate the amplitude of the output signal from said divide-by-48 counter by a selectable amount prior to filtering.

8. A subchannel data receiver, comprising:

a low pass filter coupled to said media and having a transfer function defining a passband which provides a high impedance to a majority of the frequency components above the subchannel carrier frequency but a low impedance to the frequency components of the modulated subchannel signal;

a first amplifier coupled to receive the output signal from said low pass filter;

an analog-to-digital converter having an input for receiving a signal to be converted to digital samples, and having an output at which said digital samples appear, said input having a parasitic capacitive load coupled thereto;

a two-pole active low pass filter and amplifier circuit coupled to receive the output of said first amplifier and having a transfer function suitable for performing an anti-aliasing function to eliminate or suppress the third and fifth harmonics of said subchannel carrier frequency, and functioning to buffer and amplify the signal from said first amplifier so as to drive said input including the parasitic capacitance load of said input of said analog-to-digital converter to voltages which cover all the full dynamic range of said converter;

a mixer coupled to receive said samples and having an input for data that defines a quadrature local oscillator signal having the subchannel carrier frequency;

a local oscillator for transmitting to said local oscillator input of said mixer digital data defining a quadrature local oscillator signal at the frequency of said subchannel carrier;

a digital bandpass filter with filter coefficients which establish a narrow passband which is centered on said subchannel carrier frequency and with a bandwidth wide enough to pass enough frequency components of said subchannel data spectrum to allow adequate reception of said subchannel data and which rejects a majority of frequency components of said high speed data spectrum;

means for detecting the relative amplitude of mark and space frequency signals in the output signal from said digital bandpass filter.

9. The apparatus of claim 8 further comprising a resampler circuit coupled to the output of said digital bandpass filter and having an output coupled to an input of said means for detecting the relative amplitude of mark and space frequencies.

10. A process for transmitting subchannel data bits on the same media through which a high speed data signal is transmitted, comprising:

receiving a plurality of subchannel data bits;

modulating said subchannel data bits onto a host signal to create a spectrum of subchannel frequency components and transmitting said host signal through said media directly or by superposition of said host signal with said high speed data signal;

recovering said subchannel data bits by filtering out most of the frequency components in the spectrum of said high speed data signal and passing the frequency components comprising said subchannel data through a bandpass filter with a passband centered on the center frequency of said spectrum of subchannel frequency components and with a bandwidth which is wide enough to pass most or all of the frequency components of said spectrum of subchannel frequency components while rejecting all the frequency components in the spectrum of the high speed data which lie above and below the frequencies in the spectrum of the subchannel data thereby providing much more sensitive and selective detection by elimination of more noise attributable to the high speed data signal, and recovering the subchannel data bits by generating from the signal output by said bandpass filter one or more signals having characteristics which depend upon the subchannel data bits encoded into said host signal.

11. A process for transmitting subchannel data bits on the same media through which a D.C. balanced high speed data signal is transmitted, comprising:

receiving a plurality of subchannel data bits;

frequency shift key modulating said subchannel data bits onto a subchannel carrier having a frequency in a range of frequencies on a skirt of said high speed data signal spectrum where amplitudes of the high speed data signal frequency components are sufficiently lower than the amplitudes of the frequency components in the spectrum of subchannel frequency components to allow successful detection of the subchannel bits;

superimposing the modulated subchannel carrier on said high speed data signal and transmitting a combined signal through said media;

recovering said subchannel data bits by:

filtering out most of the frequency components in the spectrum of said high speed data signal;

amplifying remaining frequency components and passing them through an anti-aliasing filter;

digitizing the output of said anti-aliasing filter;

mixing the digital representation of the filtered signal output by the anti-aliasing filter with a digital quadrature representation of a local oscillator signal at the subchannel carrier frequency;

passing the data output stream from said mixing process through a digital bandpass filter with a passband centered on the center frequency of said spectrum of subchannel frequency components and with a bandwidth which is wide enough to pass most or all of the frequency components of said spectrum of subchannel frequency components while rejecting all the frequency components in the spectrum of the high speed data which lie above and below the frequencies in the spectrum of the subchannel data thereby providing more sensitive and selective detection by elimination of more noise attributable to the high speed data signal, said digital bandpass filter also structured to resample the incoming sample stream to lower the sample rate by computing only one-of-N output samples;

recovering the subchannel data bits by processing the output data from said digital bandpass filter in two separate mark and space detectors, each of which mixes the resampled data with a digital representation of a local oscillator signal at the deviation frequency $F_D$ used in said frequency shift keyed modulation to shift the subcarrier frequency to the mark or space frequency, said mark detector local oscillator signal being at $-F_D$ and said space detector local oscillator signal being at $+F_D$, and, in each mark and space detector, filtering the resulting data from the mixing process through digital narrow bandwidth bandpass filters having passbands centered on the mark and space frequencies, respectively, and calculating an indicia of the relative amplitude of the signals represented by the data emerging from the bandpass filters in the mark and space detectors.

12. An apparatus comprising:

a media for carrying high speed digital data from a high speed digital data transmitter to a high speed digital data receiver;

a subchannel transmitter having an output coupled to said media and including a UART with a variable baud rate and having an input for receiving subchannel data in parallel format and an input for receiving a baud rate control signal, for serializing said subchannel data and outputting said subchannel data as a serial bit stream at a programmable baud rate controlled by said baud rate control signal, and further comprising a modulator which modulates such serial bit stream of subchannel data received from said UART onto a host signal for propagation across said media;

a subchannel receiver having an input coupled to said media through a low pass filter which provides a high impedance to the majority of the frequency components of the high speed data signal but a low impedance to the frequency components of the subchannel data spectrum and having an amplifier that amplifies the output of said low pass filter and having an analog-to-digital converter for converting the subchannel signal to a stream of digital samples and having a mixer and local oscillator that combine to digitally mix the frequencies output by said analog-to-digital converter down to an intermediate frequency, and having a digital bandpass filter for filtering the intermediate frequency signal using a passband which is centered on said intermediate frequency and which has a bandwidth which is wide enough to encompass enough of the frequency components of the subchannel data spectrum and exclude enough of the frequency components of the high speed data signal to provide adequate sensitivity and selectivity of said subchannel receiver to detect said subchannel data signal despite manufacture lot variations in the rise times of said high speed data signals, said digital bandpass filter having a programmable bandwidth which is changed by changing filter coefficients such that said bandwidth corresponds to at least the minimum necessary bandwidth to reliably receive the subchannel data given the baud rate output by said UART, and having one or more detectors to detect the subchannel data.

* * * * *